US012106579B2

(12) United States Patent
Mielenz et al.

(10) Patent No.: US 12,106,579 B2
(45) Date of Patent: Oct. 1, 2024

(54) METHOD FOR OPERATING AT LEAST ONE ENVIRONMENT SENSOR ON A VEHICLE

(71) Applicants: Mercedes-Benz Group AG, Stuttgart (DE); Robert Bosch GmbH, Stuttgart (DE)

(72) Inventors: Holger Mielenz, Ostfildern (DE); Christoph Gustav Keller, Stuggart (DE)

(73) Assignees: Mercedes-Benz Group AG, Stuttgart (DE); Robert Bosch GmbH, Stuttgart (DE)

( * ) Notice: Subject to any disclaimer, the term of this patent is extended or adjusted under 35 U.S.C. 154(b) by 364 days.

(21) Appl. No.: 17/755,673

(22) PCT Filed: Oct. 15, 2020

(86) PCT No.: PCT/EP2020/079050
§ 371 (c)(1),
(2) Date: May 5, 2022

(87) PCT Pub. No.: WO2021/089292
PCT Pub. Date: May 14, 2021

(65) Prior Publication Data
US 2022/0375231 A1    Nov. 24, 2022

(30) Foreign Application Priority Data
Nov. 7, 2019   (DE) ...................... 10 2019 130 037.1

(51) Int. Cl.
*G06V 20/58*    (2022.01)
*B60W 40/06*    (2012.01)

(52) U.S. Cl.
CPC ............. *G06V 20/58* (2022.01); *B60W 40/06* (2013.01); *B60W 2420/408* (2024.01); *B60W 2555/20* (2020.02)

(58) Field of Classification Search
None
See application file for complete search history.

(56) References Cited

U.S. PATENT DOCUMENTS

2019/0051007 A1*  2/2019  Pohl ........................ G06T 7/74
2020/0342623 A1*  10/2020  Cull .................. G06V 30/2504
2021/0255317 A1*  8/2021  Salomon ................ G01S 15/10

FOREIGN PATENT DOCUMENTS

| DE | 102006007788 A1 | 8/2007 |
| DE | 102013226631 A1 | 6/2015 |
| DE | 102014212216 A1 | 12/2015 |
| DE | 102016201250 A1 | 8/2017 |
| DE | 102018003784 A1 | 11/2018 |
| DE | 102018127059 A1 | 4/2020 |

* cited by examiner

Primary Examiner — Lennin R Rodriguezgonzalez
(74) Attorney, Agent, or Firm — Marshall & Melhorn, LLC

(57) ABSTRACT

A vehicle is located on a digital map, with objects being stored in the digital map in a georeferenced manner. From a set of these objects stored in a georeferenced manner in the digital map, which are currently being detected by the environment sensor, the object most distant from the environment sensor is identified and a current sensor range of the environment sensor is determined on the basis of the distance of the environment sensor from the object.

5 Claims, 1 Drawing Sheet

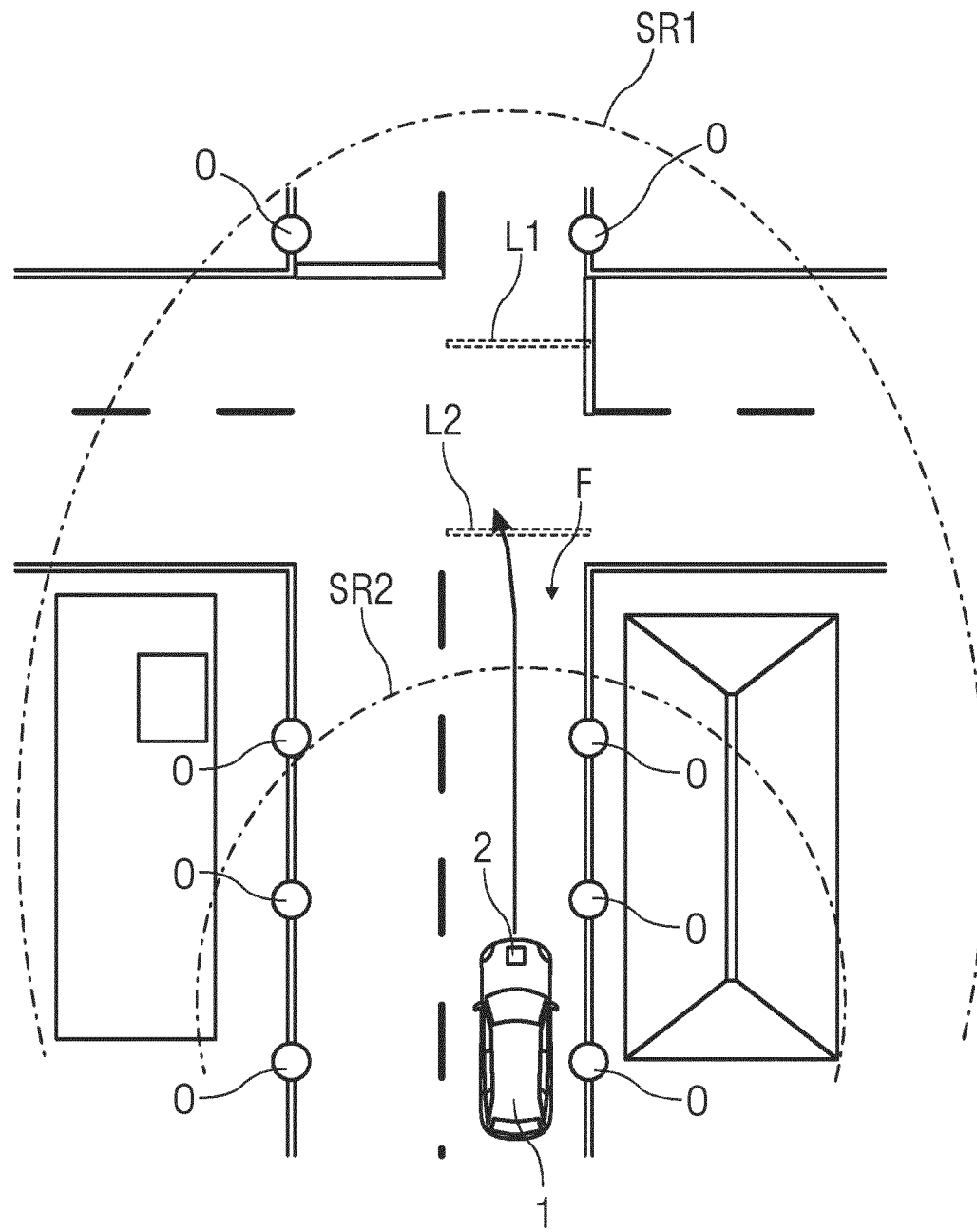

METHOD FOR OPERATING AT LEAST ONE ENVIRONMENT SENSOR ON A VEHICLE

FIELD

The invention concerns a method for operating at least one environment detection sensor on a vehicle.

BACKGROUND

Methods for operating environment detection sensors on vehicles are generally known from the prior art.

DE 10 2018 127 059.3 discloses a method for checking at least one environment detection sensor on a vehicle. In that method, the vehicle is located on a digital map and features of stationary objects in the vehicle's environment that are stored in the digital map are identified in that map, and the environment detection sensor is expected to recognize the objects based on those features. The vehicle's environment is scanned by the environment detection sensor. It is deduced that the environment detection sensor has degraded if the features whose recognition is expected are not recognized by the environment detection sensor or if the features actually recognized by the environment detection sensor deviate significantly from the features whose recognition is expected.

The invention is intended to provide a method that improves upon the prior art, for operating at least one environment detection sensor of a vehicle.

SUMMARY

The invention's objective is achieved by a method for operating at least one environment detection sensor of a vehicle with the features in the claims.

The invention's objective is achieved by a method for operating at least one environment detection sensor of a vehicle with the features in claim 1.

Advantageous embodiments of the invention are the object of the subordinate claims.

In a method according to the invention for operating at least one environment detection sensor on a vehicle, in particular an on-road vehicle, the vehicle is located on a digital map, and objects, in particular stationary objects, are stored with georeferencing on the digital map, and from a set of these objects stored with georeferencing on the digital map, which are currently being detected by the environment detection sensor, the object farthest from the environment detection sensor is identified and a current sensor range of the environment detection sensor is determined based on the distance from the environment detection sensor to that object.

The environment detection sensor is, for example, a Lidar sensor, radar sensor, ultrasound sensor, and/or optical sensor. The optical sensor is, in particular an image capturing sensor or video sensor, such as a camera, for example a stereo or mono camera. The Lidar sensor can also be considered an optical sensor.

Using the method according to the invention, the current sensor range of the environment detection sensor can be determined, at least indirectly. An actual sensor range can be larger, but not smaller, than the current sensor range determined by the method according to the invention, because that current sensor range correlates with the distance to the farthest-away object that is detected by the environment detection sensor, and in particular, corresponds to that distance. It is possible for the actual sensor range to extend even farther, if there are no more distant objects located within the actual sensor range that could be detected by the environment detection sensor.

Using the method, for example, it is possible to establish an actual sensor range that was previously reduced due to atmospheric influences and the resulting functional limitations, in particular, quickly and without additional sensors or other services. Such atmospheric influences include, for example, rain, fog, snow, and/or artefacts resulting from them on a road surface, such as moisture, frost, and/or snowflakes. This makes it possible, for example, to generate a corresponding system reaction from at least one vehicle system using that environment detection sensor, or from multiple such vehicle systems on the vehicle, leading to improved safety. The method is applicable, for example, to automated and/or autonomously operating vehicles that use one or more such environment detection sensors to detect the environment around the vehicle while it is driving.

For example, the distance from the environment detection sensor to this object identified as farthest away from the environment detection sensor is established as the current sensor range of the environment detection sensor. This applies in particular to a detection range that extends in circular or spherical form, or at least as circular or spherical segments, around the environment detection sensor, so that a border of this detection range, i.e., the current sensor range of the environment detection sensor, is the same size for all detection directions within that detection range.

In particular, if the environment detection sensor has a differently shaped detection range, for example, elliptic or ellipsoid or in the form of a segment of the generated detection range, then it is advantageously assumed that the identified object farthest away from the environment detection sensor lies at the limit of that detection range, so that based on the distance to that object, in particular in relation to a determined angled position of that object with respect to the environment detection sensor, and based on the known shape of the detection range, the current detection range of the environment detection sensor, and in particular the limits of the current detection range for all angled positions, i.e., for all detection directions, can be established, thereby allowing the current sensor range of the environment detection sensor for all detection directions within the detection range to be determined. The sensor range thereby advantageously includes a range specification for every angled position, i.e., for every detection direction. The determined current sensor range therefore corresponds to a current distance from the border of an environment detection sensor's current detection range to that environment detection sensor. This manner of determining the current sensor range can naturally be used for other detection range shapes, in particular also for a detection range that extends in circular or spherical form, or at least as circular or spherical segments, around the environment detection sensor.

According to the invention, object information related to the respective objects is stored on the digital map, wherein, at least for that environment detection sensor and for different detection conditions, the object information for each object gives a respective distance from the environment detection sensor to the object, at which the object can be detected by the environment detection sensor, wherein the object information for the object farthest away from the environment detection sensor that is currently being detected by the environment detection sensor is called up from the digital map and used to determine the detection conditions whose assigned distance best correlates with the determined current sensor range of the environment detection sensor, i.e., in particular has the least deviation from the determined current sensor range of the environment detection sensor. Therefore, not only can the current sensor range be determined, but in addition the basis for that current sensor range can be determined, in particular if the current sensor range is limited in comparison to a sensor range with optimal detection conditions. In particular, atmospheric influences causing the respective, specifically limited, current sensor range can be determined in this way. For example, the probability of a change in road surface friction conditions, due to frost, snow, and/or ice, can be determined. This can result in a corresponding system reaction from at least one vehicle system or multiple vehicle systems, such as a reduction in the vehicle's speed and/or an increase in the safety distance between the vehicle and another vehicle in front of it in traffic.

Advantageously, for various types of environment detection sensors, such as Lidar sensors, radar sensors, ultrasound sensors and/or optical sensors, in particular image capturing sensors, including cameras, such as stereo and/or mono cameras, the object information for each object should give the respective distance from the environment detection sensor to the object at which the object can be detected by each type of environment detection sensor. This allows the described procedures for the various types of environment detection sensors on the vehicle to be followed, thereby allowing the respective detection conditions to be determined by multiple environment detection sensors on the vehicle.

In one form of executing the method, for the respective object, the object information is determined that gives at least the respective distance from the environment detection sensor to the object at which the object can be detected by the environment detection sensor, for that environment detection sensor under various detection conditions, whereby the object is detected by the environment detection sensor and/or a similar type of environment detection sensor and is combined and evaluated together with the respective existing detection conditions, in particular weather conditions, in particular on a server external to the vehicle. This allows the vehicle's environment detection sensor, and in particular similar types of environment detection sensors on multiple vehicles, to learn the information, so that additional effort and expense to generate that information separately in other ways is avoided.

In one form of executing the method, the detection conditions determined by multiple environment detection sensors on the vehicle and/or detection conditions determined based on multiple objects are compared to each other. In this way, for example, it is possible to ensure that a determined decrease in the sensor range is not due to a hardware problem with a particular environment detection sensor, but instead is actually due to atmospheric influences, in particular when the same detection conditions are determined by multiple environment detection sensors.

Alternatively to the solution according to the invention as described above, and/or to one or more of the aforementioned forms of execution or additional ones, it is possible, for example, using an environment detection sensor configured as an optical sensor, i.e., for example, an environment detection sensor configured as a Lidar sensor or image capturing sensor, to determine a current road surface detection range of that environment detection sensor and, using road surface conditions and assigned road surface detection ranges stored in a table, for example, to determine a current road surface condition. This can be a component of the above-described method for operating at least one environment detection sensor of a vehicle, or alternatively, for example, can be handled in an alternative manner, i.e., using an alternative method for operating at least one environment detection sensor on a vehicle. The optical sensor, in particular an image capturing sensor, is, for example, a camera such as a stereo or mono camera, in particular a video sensor. Alternatively, the optical sensor can also be a Lidar sensor, for example, as already mentioned above.

In the event of water on the road surface, i.e. when there is a coating of water on the road surface, the road surface detection range is decreased in comparison to a dry road surface, because, for example, the water coating on the road surface reduces the backscatter of the Lidar signal from an environment detection sensor configured as a Lidar sensor. In addition, for an environment detection sensor configured as an image capturing sensor, in the event of water on the road surface, i.e. when there is a coating of water, in particular a water film, on the road surface, especially in combination with sunshine, the road surface detection range is decreased in comparison to a dry road surface, because the water coating on the road surface, especially combined with the sunshine, can cause reflection that blinds the image capturing sensor, in particular a video sensor.

The particular type of a road surface condition change can thereby be ascertained. It is also possible, for example, for a corresponding system reaction by at least one vehicle system or multiple such vehicle systems on the vehicle to occur, leading to improved safety, for example by adjusting the vehicle's speed and/or the distance between the vehicle and another vehicle in front of it in traffic as appropriate for the determined road condition.

DESCRIPTION OF THE FIGURES

Examples of the invention are explained in more detail below, with reference to a FIGURE.

The FIGURE shows:

FIG. 1 schematic drawing of a vehicle with at least one environment detection sensor on a road.

DETAILED DESCRIPTION

FIG. 1 schematically shows one possible situation, in particular a traffic situation, with a vehicle 1, in particular an on-road vehicle, that has at least one environment detection sensor 2, on a road F. The environment detection sensor 2 is, for example, a Lidar sensor, radar sensor, ultrasound sensor, and/or an optical sensor, in particular an image capturing sensor such as a camera, for example a stereo or mono camera, in particular a video sensor. The Lidar sensor can also be considered an optical sensor. The vehicle 1 advantageously has multiple different types of environment detection sensors 2.

Using the at least one or multiple respective environment detection sensors 2 on the vehicle 1, the environment around the vehicle 1 is sensed. This is used, for example, to determine the position of the vehicle 1, in particular based on stationary objects O in the environment of the vehicle 1 and/or the operation of at least one vehicle system or multiple vehicle systems, in particular vehicle systems that assist a vehicle driver in driving the vehicle 1 and/or vehicle systems that perform automated, in particular partially or fully automated, or autonomous driving of the vehicle 1. The vehicle 1 is therefore an automated or autonomous vehicle 1, for example.

In one method for operating such an environment detection sensor 2, described below in greater detail based on FIG. 1, the vehicle 1 is located on a digital map, wherein, in particular, stationary objects O are stored with georeferencing on the digital map and are or should be detected by the environment detection sensor 2. From a set of these objects O stored with georeferencing on the digital map, which are currently being detected by the environment detection sensor 2, the object O farthest from the environment detection sensor 2 is identified and a current sensor range of the environment detection sensor 2 is determined based on the distance from the environment detection sensor 2 to that object O.

For example, the distance from the environment detection sensor 2 to the object O is established as the current sensor range of the environment detection sensor 2. This applies in particular to a detection range that extends in circular or spherical form, or at least as circular or spherical segments, around the environment detection sensor 2, so that a border of this detection range, i.e., the current sensor range of the environment detection sensor 2, is the same size for all detection directions within that detection range.

In particular, if the environment detection sensor has a differently shaped detection range, for example elliptic or ellipsoid or in the form of a segment of the generated detection range, as shown in FIG. 1, then it is advantageously assumed that the identified object O farthest away from the environment detection sensor 2 lies at the limit of that detection range, so that based on the distance to that object O, in particular in relation to a determined angled position of that object O with respect to the environment detection sensor 2, and based on the known shape of the detection range, the current detection range of the environment detection sensor 2, and in particular the limits of the current detection range for all angled positions, i.e., for all detection directions, can be established, thereby allowing the current sensor range of the environment detection sensor 2 for all detection directions within the detection range to be determined. The sensor range thereby advantageously includes a range specification for every angled position, i.e., for every detection direction. The determined current sensor range therefore corresponds to a current distance from the border of an environment detection sensor 2's current detection range to that environment detection sensor 2. This manner of determining the current sensor range can naturally be used for other detection range shapes, in particular also for a detection range that extends in circular or spherical form, or at least as circular or spherical segments, around the environment detection sensor 2.

Types of stationary objects O are, for example, guard rails, buildings, and/or, as in the example shown here, posts such as reflector posts.

The method thereby offers a quick and simple way, in particular with no additional equipment expense, to determine, at least indirectly, the currently existing sensor range of the environment detection sensor 2, using at least one sensor technology of the in particular automated or autonomously driving vehicle 1. The environment detection sensor 2, in particular the sensor technology of the environment detection sensor 2, can experience functional limitations due to atmospheric influences, for example. This is recognized by the method described here, which allows, for example, a corresponding system reaction by at least one vehicle system or multiple vehicle systems. For example, in the event of a determined current sensor range that is reduced compared to a sensor range with optimal detection conditions, the speed of the vehicle 1 can be reduced and/or the distance to another vehicle travelling in front of the vehicle in traffic can be increased. Atmospheric influences that can lead to a reduction in sensor range are, for example, rain, fog, snow, and/or artefacts resulting from them on a road surface, such as moisture, frost, and/or snowflakes.

To date, for example, atmospheric influences have been reported by a transmission service, in the form of weather notifications, for example, and can then be referenced appropriately. However, such weather notices are often highly inaccurate with respect to the actual situation in the very limited specific local area surrounding the vehicle 1. Using the method described here, from now on this will no longer be necessary, because a current reduced sensor range, in particular due to atmospheric influences, can be determined by the environment detection sensor 2 itself.

Advantageously, using the method, the respective existing atmospheric cause for the possible existing current reduced sensor range can be ascertained. As a result, for example, it can then be possible to determine the probability of a change in road surface friction conditions, and therefore, for example, the driving operation of the vehicle 1 can be correspondingly adjusted, for example by decreasing the speed and/or increasing the distance to another vehicle travelling in front of the vehicle in traffic, so that safety is increased.

In order to make this possible, respective object information concerning the objects O is advantageously stored in the digital maps, so that the object information for each object O gives a respective distance from the environment detection sensor 2 to the object O, for that environment detection sensor 2 and also for similar types of environment detection sensors 2 under various detection conditions, at which the object O can be detected by the environment detection sensor 2. The object information for the object O located farthest from the environment detection sensor 2 that is currently being detected by the environment detection sensor 2 is then called up from the digital map, and from that the detection conditions are determined whose assigned distance for the environment detection sensor 2 best correlates with the determined current sensor range of the environment detection sensor 2. In this way, advantageously, the respective detection conditions are determined for which the assigned distance from the environment detection sensor 2 to the object O, i.e., to the object O located farthest from the environment detection sensor 2 that is currently being detected by the environment detection sensor 2, is closest to the determined current sensor range.

In the example according to FIG. 1, the georeferenced objects O stored in the digital map are configured as posts, such as reflector posts. The FIGURE shows a large sensor range SR1, for example a maximum sensor range with good, specifically optimal, atmospheric conditions, in particular weather conditions, and a smaller current sensor range SR2 due to atmospheric influences. It can be seen that with good, specifically optimal, atmospheric conditions, in particular weather conditions, the resulting large sensor range SR1 allows objects O at a greater distance from the vehicle 1, i.e., the objects O farthest from the vehicle 1 shown here, to be detected by the environment detection sensor 2. With the smaller current sensor range SR2, these objects O at a greater distance from the vehicle 1, i.e., the objects O farthest from the vehicle 1 shown here, can no longer be detected by the environment detection sensor 2, but instead only the objects O that are located closer to the environment detection sensor 2 and therefore lie within the smaller current sensor range SR2. As described above, the information stating the distance from the vehicle 1 at which a respective object O can be detected by the environment detection sensor 2 under the respective detection conditions is stored in the digital maps, so that, depending on the determined sensor range and on the respective object O that is located farthest from the environment detection sensor 2 and can currently be detected by the environment detection sensor 2, the respective detection conditions and therefore the respective atmospheric causes for the smaller current sensor range SR2 can be ascertained.

Advantageously, for various types of environment detection sensors 2, such as Lidar sensors, radar sensors, ultrasound sensors and/or optical sensors, in particular image capturing sensors, including cameras, such as stereo and/or mono cameras, and in particular video sensors, the object information for each object O should give the respective distance from the environment detection sensor 2 to the object O at which the object O can be detected by each type of environment detection sensor 2. In other words, for each type of environment detection sensor 2, various detection conditions and assigned distances to each object O, at which the object O can be detected with the respective type of environment detection sensor 2 under the respective detection conditions, are stored. This allows the described procedures for the various types of environment detection sensors 2 on the vehicle 1 to be followed, thereby allowing the respective detection conditions to be determined by multiple environment detection sensors 2 on the vehicle 1.

This makes it possible, for example, to compare the determined detection conditions of multiple environment detection sensors 2 on the vehicle 1, i.e., the detection conditions determined respectively by the multiple environment detection sensors 2, with each other. In this way, for example, it is possible to ensure that a determined decrease in the sensor range is not due to a hardware problem with a particular environment detection sensor 2, but instead is actually due to atmospheric influences, in particular when the same detection conditions are determined by multiple environment detection sensors 2. Alternatively or additionally, detection conditions determined by the environment detection sensor 2 itself based on multiple objects O can be compared to each other, in order to rule out the possibility that the determined smaller sensor range is due to a hardware problem with the environment detection sensor 2.

For example, the detection ranges for objects O from a particular or at least multiple positions can be learned, wherein these objects O are combined and assessed together with additional respective existing detection conditions, in particular in the form of weather information. This is done advantageously on a server external to the vehicle, also known as a backend server. In other words, for the respective object O, the object information is determined that gives the respective distance from the one or multiple environment detection sensor(s) 2 to the object O at which the object O can be detected by the environment detection sensor 2, for that environment detection sensor 2 under various detection conditions, whereby the object O is detected by the environment detection sensor 2 and/or a similar type of environment detection sensor 2 and is combined and evaluated together with the respective existing detection conditions, in particular weather conditions, in particular on the server external to the vehicle. This allows the vehicle 1's environment detection sensor 2, and in particular similar types of environment detection sensors 2 on multiple vehicles 1, to learn the information, so that additional effort and expense to generate that information separately in other ways is avoided.

Alternatively to the above-described approach, or advantageously in addition to it, it is possible, for example, using an environment detection sensor 2 configured as an optical sensor, i.e., in particular an environment detection sensor 2 configured as a Lidar sensor or an environment detection sensor 2 configured as an image capturing sensor, in particular as a video sensor, such as a camera, for example a stereo or mono camera, to determine a current road surface detection range of that environment detection sensor 2 and, using road surface conditions and assigned road surface detection ranges stored in a table, for example, to determine a current road surface condition. With an environment detection sensor 2 configured as a Lidar sensor, the current road surface detection range is determined in particular using the respective timing of a backscatter signal from the Lidar sensor.

In the example shown according to FIG. 1, the road surface is detected using the environment detection sensor 2 configured as a Lidar sensor, for example using a dedicated Lidar system, up to a first line L1 for dry road surfaces, as shown in FIG. 1, for example. Due to poorer road surface conditions, in particular due to a heavier water coating, the backscatter intensity of the Lidar sensor signal is reduced, in which case the road surface can then be detected only for a shorter distance, shown in FIG. 1 by a second line L2 closer to the vehicle 1. By reducing the road surface range and using the road surface conditions and assigned road surface detection ranges stored in the table, for example, the respective type of the road surface change can be ascertained. It is also possible, for example, for a corresponding system reaction by at least one vehicle system or multiple such vehicle systems on the vehicle 1 to occur, leading to improved safety, for example by adjusting the vehicle's speed and/or the distance between the vehicle 1 and another vehicle in front of it in traffic as appropriate for the determined road condition.

Alternatively to configuring the environment detection sensor 2 as a Lidar sensor, the environment detection sensor 2, as previously stated, can also be configured as another optical sensor, in particular an image capturing sensor or specifically as a video sensor such as a camera, a stereo or mono camera, for example. Then the road surface is detected using this optical sensor up to the first line L1 for dry road surfaces, as shown in FIG. 1, for example. With poorer road surface conditions, in particular a heavier water coating, especially in combination with sunshine and the resulting reflection that blinds the optical sensor, the road surface can then be detected only for a shorter distance, shown in FIG. 1 by the second line L2 closer to the vehicle 1. Here also, by reducing the road surface range and using the road surface conditions and assigned road surface detection ranges stored in the table, for example, the respective type of the road surface change can be ascertained. It is also possible, for example, for a corresponding system reaction by at least one vehicle system or multiple such vehicle systems on the vehicle 1 to occur, leading to improved safety, for example by adjusting the vehicle's speed and/or the distance between the vehicle 1 and another vehicle in front of it in traffic as appropriate for the determined road condition.

LIST OF REFERENCE INDICATORS

1 Vehicle
2 Environment detection sensor
F Road
L1 First line
L2 Second line
O Object
SR1 Large sensor range
SR2 Smaller current sensor range

The invention claimed is:

1. A method for operating at least one environment detection sensor on a vehicle, comprising:

locating a the vehicle on a digital map, wherein objects are stored with georeferencing on the digital map, and wherein from a set of these objects stored with georeferencing on the digital map, which are currently being detected by the environment detection sensor, the object farthest from the environment detection sensor is identified and a current sensor range of the environment detection sensor is determined based on the distance from the environment detection sensor to that object, and object information related to the respective objects is stored on the digital map, wherein, at least for that environment detection sensor and for different detection conditions, the object information for each object gives a respective distance from the environment detection sensor to the object, at which the object can be detected by the environment detection sensor, wherein the object information for the object farthest away from the environment detection sensor is called up from the digital map and used to determine the detection conditions whose assigned distance for the environment detection sensor best correlates with the determined current sensor range of the environment detection sensor.

2. The method as in claim 1, wherein the distance from the environment detection sensor to this object is established as the current sensor range of the environment detection sensor.

3. The method as in claim 1, wherein for the respective object, object information is determined that at least gives the respective distance from the environment detection sensor to the object at which the object can be detected by the environment detection sensor, for that environment detection sensor under various detection conditions, whereby the object is detected by the environment detection sensor and/or a similar type of environment detection sensor and is combined and evaluated together with the respective existing detection conditions, in particular weather conditions.

4. The method as in claim 1, wherein the detection conditions determined by multiple environment detection sensors on the vehicle and/or detection conditions determined based on multiple objects are compared to each other.

5. The method as in claim 1, wherein using an environment detection sensor configured as an optical sensor comprising an environment detection sensor configured as a Lidar sensor or as an image capturing sensor comprising a video sensor, a current road surface detection range is determined for that environment detection sensor and, using stored road surface conditions and assigned road surface detection ranges, a current road surface condition is determined.

* * * * *